(12) United States Patent
Hogg et al.

(10) Patent No.: US 9,286,459 B2
(45) Date of Patent: Mar. 15, 2016

(54) AUTHORIZED REMOTE ACCESS TO AN OPERATING SYSTEM HOSTED BY A VIRTUAL MACHINE

(71) Applicant: GlobalFoundries Inc., Grand Cayman (KY)

(72) Inventors: Anthony B. Hogg, Hats (GB); Peter M. Jenkin, Alton (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/326,761

(22) Filed: Jul. 9, 2014

(65) Prior Publication Data

US 2015/0082409 A1    Mar. 19, 2015

(30) Foreign Application Priority Data

Sep. 18, 2013  (GB) .................... 1316561.8

(51) Int. Cl.
  *G06F 21/30*  (2013.01)
  *G06F 21/33*  (2013.01)
  *G06F 21/31*  (2013.01)
  *G06F 9/44*  (2006.01)
  *H04L 9/32*  (2006.01)
  *G06F 21/12*  (2013.01)
  *G06F 21/57*  (2013.01)

(52) U.S. Cl.
  CPC .............. *G06F 21/33* (2013.01); *G06F 9/4401* (2013.01); *G06F 9/442* (2013.01); *G06F 9/4406* (2013.01); *G06F 9/4416* (2013.01); *G06F 21/31* (2013.01); *G06F 21/335* (2013.01); *H04L 9/3228* (2013.01); *H04L 9/3234* (2013.01); *G06F 9/441* (2013.01); *G06F 21/121* (2013.01); *G06F 21/128* (2013.01); *G06F 21/575* (2013.01); *H04L 9/3263* (2013.01); *H04L 9/3268* (2013.01)

(58) Field of Classification Search
None
See application file for complete search history.

(56) References Cited

U.S. PATENT DOCUMENTS

| | | | |
|---|---|---|---|
| 5,349,643 A | 9/1994 | Cox et al. | |
| 6,189,100 B1 | 2/2001 | Barr et al. | |
| 6,795,923 B1 | 9/2004 | Stern et al. | |
| 7,024,555 B2 | 4/2006 | Kozuch et al. | |
| 7,415,620 B2 | 8/2008 | England et al. | |
| 7,949,677 B2 | 5/2011 | Croft et al. | |
| 8,181,028 B1* | 5/2012 | Hernacki et al. | 713/182 |
| 8,677,449 B1* | 3/2014 | Beda, III | 726/1 |
| 8,800,009 B1* | 8/2014 | Beda et al. | 726/6 |
| 2003/0196085 A1 | 10/2003 | Lampson et al. | |
| 2005/0114687 A1* | 5/2005 | Zimmer et al. | 713/193 |
| 2007/0300220 A1* | 12/2007 | Seliger et al. | 718/1 |

(Continued)

OTHER PUBLICATIONS

Lampson et al; Authentication in Distributed Systems: Theory and Practice, 1-46, 1992.

(Continued)

*Primary Examiner* — Andrew Nalven
*Assistant Examiner* — Christopher Reprecht
(74) *Attorney, Agent, or Firm* — Gibb & Riley, LLC

(57) ABSTRACT

Proposed is a concept for providing authorized remote access to an operating system hosted by a virtual machine. First and second authentication tokens are generated at a client system and communication to a server system providing the virtual machine. The validity of the first and second authentication tokens is verified at the server system. If the validity of the first authentication token is verified, the operating system is shut-down. Then, if the validity of the second authentication token is verified, the operating system is re-started.

15 Claims, 3 Drawing Sheets

(56) References Cited

U.S. PATENT DOCUMENTS

| | | | | |
|---|---|---|---|---|
| 2008/0301770 | A1* | 12/2008 | Kinder | 726/2 |
| 2009/0049510 | A1* | 2/2009 | Zhang | G06F 21/53 726/1 |
| 2009/0172781 | A1* | 7/2009 | Masuoka | H04L 63/105 726/3 |
| 2010/0146611 | A1* | 6/2010 | Kuzin | H04L 63/0815 726/8 |
| 2010/0242038 | A1* | 9/2010 | Berrange et al. | 718/1 |
| 2011/0246773 | A1* | 10/2011 | Sidle | G06F 21/305 713/168 |
| 2012/0060153 | A1 | 3/2012 | Bealkowskj | |
| 2012/0084768 | A1* | 4/2012 | Ashok | G06F 9/45558 717/174 |
| 2012/0096271 | A1* | 4/2012 | Ramarathinam et al. | 713/172 |
| 2012/0179904 | A1* | 7/2012 | Dunn et al. | 713/155 |
| 2012/0239729 | A1 | 9/2012 | Hefter | |
| 2012/0266231 | A1* | 10/2012 | Spiers et al. | 726/12 |
| 2013/0024681 | A1* | 1/2013 | Gattegno | G06F 8/63 713/2 |
| 2013/0024920 | A1 | 1/2013 | Rodriguez | |
| 2013/0031000 | A1 | 1/2013 | Morris | |
| 2013/0066770 | A1* | 3/2013 | Das et al. | 705/39 |
| 2013/0066945 | A1* | 3/2013 | Das et al. | 709/203 |
| 2013/0340063 | A1* | 12/2013 | Larsson | 726/9 |
| 2014/0115341 | A1* | 4/2014 | Robertson | 713/183 |
| 2014/0208096 | A1* | 7/2014 | Brandwine | G06F 21/602 713/156 |

OTHER PUBLICATIONS

IBM, User's Guide and Reference for IBM z/OS® Remote Access Programs, 1-79, Apr. 8, 2013.
UK Search report, Application No. GB 1316561.8, 1-3, Feb. 7, 2014.

* cited by examiner

AUTHORIZED REMOTE ACCESS TO AN OPERATING SYSTEM HOSTED BY A VIRTUAL MACHINE

FIELD OF THE INVENTION

This invention relates to the field of providing remote access to computer systems and more particularly to providing authorized remote access to an operating system hosted by a virtual machine.

BACKGROUND

Remote access computing is widely known in the field of computing. Typically, a remote access computing environment provides an operating system (OS) which runs on server hardware. A remote access program is implemented on the server which is accessible to users of the remote access program via a network.

Typically, the server runs a Virtual Machine (VM) which hosts an operating system supporting multiple guest systems, each capable of supporting multiple users in a unique environment. A VM is a software facility that allows one physical processor to be configured with multiple "virtual" processors or machine. Each VM normally runs independently of every other VM and may run any operating system and software.

Each remote access participant is typically provided with a dedicated guest OS, which appears to the user as a server running a native operating system. The guest OS will Initial Program Load (IPL) automatically when a VM user logs on and issues a command to start the process. Thus, before utilising a guest OS, a user must first access the server and initialise (i.e. IPL) the guest OS.

Techniques for securing such remote access have been sought, many of which are not appropriate or too expensive to implement.

BRIEF SUMMARY OF THE INVENTION

There is proposed a concept for providing authorised remote IPL in VM-hosted OSs. By employing a pass ticket, remote IPL requests for a VM-hosted (e.g. second level) OS may be authenticated so as to secure the control or use of the VM-hosted OS and/or prevent unauthorised remote access to the OS and its functionality. Using a resource access control facility (RACF), a passticket (such as a single use or 'use-once' password) or authentication key may be implemented which enables a remote IPL request to be checked and authenticated without requiring additional hardware or proprietary systems.

Thus, embodiments may be used to provide authorized remote access to an OS hosted by a VM. First and second authentication tokens may be generated at a client system and communicated to a server system providing the VM. The validity of the first and second authentication tokens may be verified at the server system. If the validity of the first authentication token is verified, the OS is shut-down. Then, if the validity of the second authentication token is verified, the OS is re-started.

According to an aspect of the invention, there is provided a method for performing an authorised IPL in a VM-hosted OS from a remote system.

According to an embodiment, there is provided a method for providing authorized remote access to an operating system hosted by a virtual machine, VM, the method comprising: on a remote system and on a VM-host, defining a first profile and first key for a first user of the hosted system and defining a second profile and second key for a second user of the hosted system; on receipt of a request for an initial program load at the remote system, creating a pass key for the second user, creating a shut-down instruction using the pass key for the second user, and sending the shut-down instruction to the VM-hosted system; on receipt of the shut-down instruction at the VM-hosted system, checking the shut-down instruction is valid by comparing the pass key for the second user with the second key and, if valid, executing the shut-down instruction on the VM-hosted system so as to shut-down the VM-hosted system; after the VM-hosted system is shut-down, creating a pass key for the first user and sending a record to the first user, the record containing the pass key for the first user and an initial program load request; on receipt of the record, checking that the pass key for the first user is valid by comparing the pass key for the first user with the first key and, if valid, issuing a request for an initial program load to restart the VM-hosted system.

Prior to generating a second authentication token and an IPL instruction for the operating system, the OS may be monitored to determine when it is completely shut-down.

The shut-down instruction may further comprise at least one of: an identification of a user of the client system; and an identification of the operating system. Also, the IPL instruction may further comprise at least one of: an identification of a user of the client system; and an identification of the operating system. Accordingly, in an embodiment, at least one of: the first authentication token; and the second authentication token may be generated based on at least one of: the received request for an IPL; and authentication information provided by the client system or a user of the client system.

In an embodiment, at least one of: the first authentication token; and the second authentication token may comprise a one-time use pass key adapted to be rendered invalid after a single use. A single use of the one-time use pass key may comprise the process of verifying if the one-time passkey is valid, and the one-time passkey is valid may be rendered invalid irrespective of the outcome of the verification process.

According to another aspect of the invention, there is provided a computer program product for providing authorized remote access to an OS hosted by a VM on server system.

According to yet another aspect of the invention, there is provided a client system for providing authorized remote access to an OS hosted by a VM of a server system.

According to a further aspect of the invention, there is provided a server system for providing authorized remote access to an operating system hosted by a VM of the server system.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

It is proposed to define two user profiles, each with an associated authentication key. A remote IPL request may be firstly be authenticated against the second user profile and, if authenticated, the VM-hosted OS shut-down. Next, the remote IPL request may be secondly authenticated against the first user profile and, if authenticated, the VM-hosted OS may be re-started Authentication may employ one-time use pas-stickets, which are a form of single use key/password that can only be used a single time, thereby enabling secure authentication across a network (which may not be secure). In this way, remote IPL of the VM-hosted OS may be secured.

Figure 1:
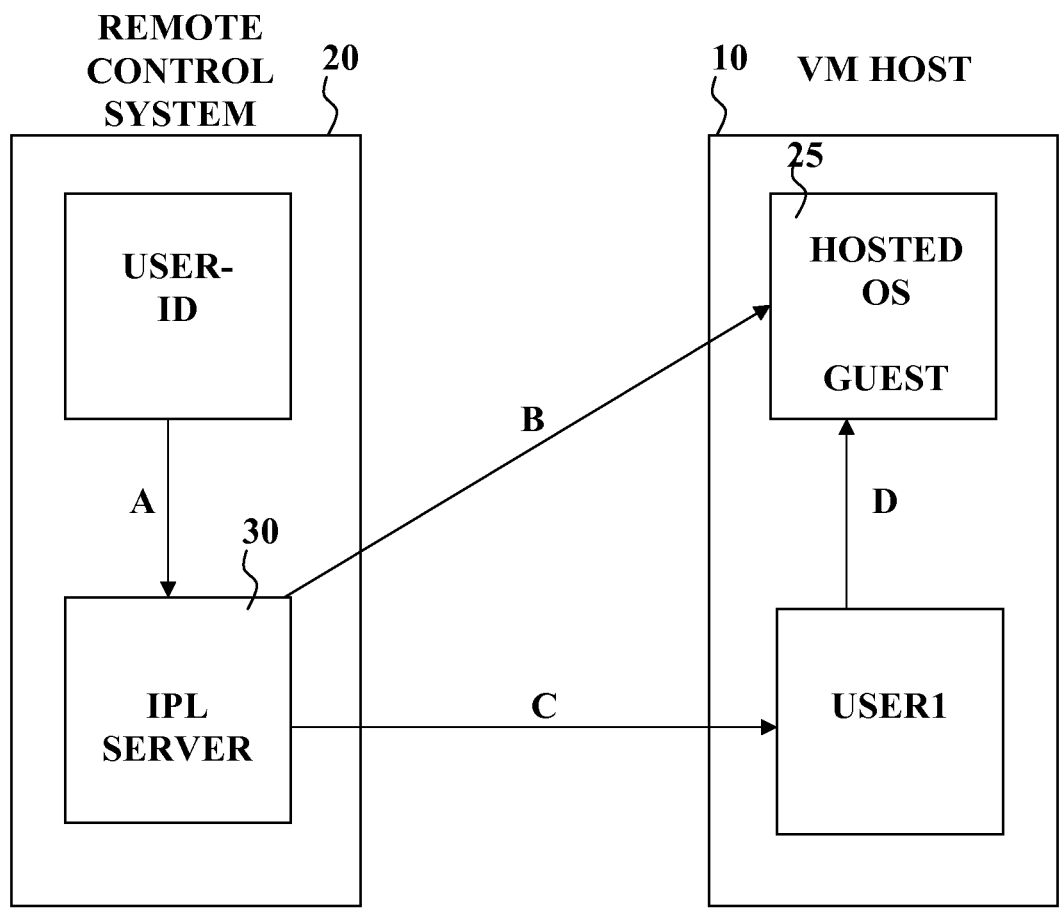
FIG. 1 is a block diagram illustrating an embodiment of the invention.

Referring to FIG. 1, there is illustrated an embodiment of the invention. There is provided a concept for performing an authorised IPL in an OS of a VM host 10 from a remote system 20.

On the remote system 20, a first profile and first key is defined for a first user USER1 of the VM host 10. Also, on the remote system 20, a second profile and second key is defined for a second user GUEST of the hosted OS 25 of the VM host 10.

On the VM host, matching profiles and key are also defined. In other words, on the VM host 10, a first profile and first key is defined for a first user USER1 of the VM host 10, wherein the first profile and first key on the VM host 10 match the first profile and first key of the remote system 20. Similarly, on the VM host 10, a second profile and second key is defined for a second user GUEST of the hosted OS 25, wherein the second profile and second key on the VM host 10 match the second profile and second key of the remote system 20.

Access to generate keys/passwords can be tightly controlled by a Resource Access Control Facility (RACF) on all three systems (the VM host 10, the remote control system 20, and the hosted OS 25). The RACF may generate single-use passwords for secure network requests.

An authorised user USER-ID of the remote system 20 uses a dialog to request an IPL (as indicated by the arrow labelled "A"). The requested IPL can be requested to be immediate or can be scheduled for a particular time.

At the appropriate time, a control program in the IPL server 30 of the remote control system 20 creates a pass key for the second user GUEST of the hosted OS 25 using the second key of the remote system 20. The IPL server 30 then creates a shut-down instruction using the pass key as a password for the second user GUEST, and subsequently sends the shut-down instruction to (the second user GUEST on) the hosted OS 25 (as indicated by the arrow labelled "B"). The transmitted shut-down instruction commands the hosted OS 25 to close. Consequently, upon receipt of the shut-down instruction at hosted OS 25, the authenticity of the pass key is checked and, if authenticated, the shut-down instruction is executed by the hosted OS 25 and the hosted OS 25 shuts-down.

After the hosted system is shut-down, the remote control system 20 creates a pass key for the first user USER1 of the VM host 10 using the first key of the remote system 20. The IPL server 30 then creates a record using the pass key for the first user USER1 as a password for the first user USER1. The records comprises: an identification of the hosted OS 25; an IPL request; the pass key for the first user USER1; and identification of the requesting party (e.g. USER-ID)

The generated record is then transmitted from the IPL server 30 to the first user USER1 of the VM host 10 (as indicated by the arrow labelled "C"). Upon receipt of the record, the authenticity of the pass key of the record is checked and, if authenticated, the requested IPL is executed so as to restart the hosted OS 25 (as indicated by the arrow labelled "D").

Figure 2:
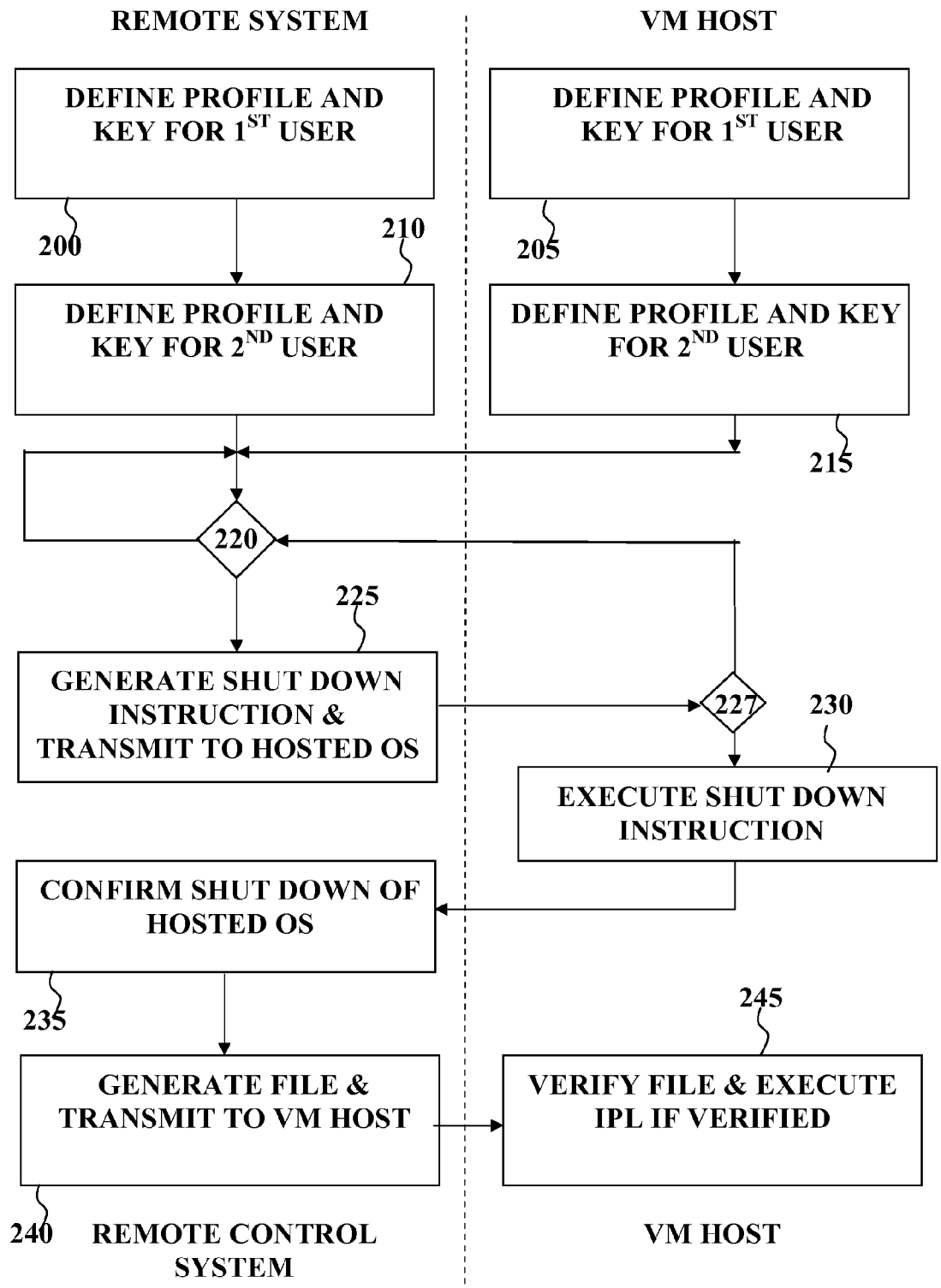
FIG. 2 is a flow diagram of a method according to an embodiment of the invention.

Referring now to FIG. 2, there is shown a flow diagram of an embodiment of the invention. The flow diagram is illustrated with two sides (one for the remote system and one for the VM host) so as to indicate where each step is implemented. In other words, the flow diagram indicates which part of a system according to an embodiment undertakes a particular step based on which side of the flow diagram the step is located. It will, however, be appreciated that this is purely exemplary of a particular embodiment and that other embodiments may undertake one or more steps may be undertaken at different locations and/or by different parts/components.

In step 200, a first profile and first key for a first user of the VM host is defined on the remote system. Similarly, in step 205, the first profile and first key for the first user is also defined on the VM-host. Thus, the same (i.e. matching) first profiles and first keys are defined on both the remote system and the VM-host.

In step 210, a second profile and second key for a second user of the hosted OS is defined on the remote system. Similarly, in step 215, the second profile and second key for the second user of the hosted OS is also defined on the VM hosted system. Thus, the same (i.e. matching) second profiles and second keys are defined on both the remote system and the VM-hosted system.

In step 220, it is determined if an IPL is requested by a user of the remote system. If no IPL request is made, the method returns to step 220 whereby it is again determined if an IPL request is made. In other words, the method repeatedly undertakes step 220 to monitor for the occurrence of an IPL request.

When, at step 220, it is determined that an IPL request has been made by a user of the remote system, the method proceeds to step 225.

Based on the detected IPL request, the remote system generates a shut-down instruction and transmits the generated shut-down instruction to the VM-hosted system in step 225. Here, the shut-down instruction is generated so as to comprise a first authentication key for the second user of the hosted OS, the first authentication key being created from using the second key of the remote system 20.

Next, in step 227, the IPL request is received at the VM-hosted system and verified by checking the first authentication key of the IPL request. If the first authentication key of the IPL request is determined to be invalid, the IPL request is ignored by the VM hosted system and the method simply returns to step 220. If, on the other hand, the first authentication key of the IPL request is determined to be valid, the method proceeds to step 230 wherein the shut-down instruction is executed by the VM-hosted system so as to shut down the VM-hosted system.

In step 235, the remote system confirms that the VM-hosted system has been shut down as expected. This may be done by simply waiting for a predetermined amount of time or may be actively confirmed by pinging the VM-hosted system and checking for a response, for example. Other methods to ensure that the VM-hosted system has been shut down before the method proceeds further may be used.

Once it has been confirmed in step 235 that the VM-hosted system is shut-down, the method proceeds to step 240 in which a data file is generated and transmitted to the first user of the VM host. Here, the data file is generated so as to comprise an IPL request for the VM-hosted system a second authentication key for first user of the VM host.

Next, in step 245, the data file is received by the first user of the VM-host and verified by checking its second authentication key. If the second authentication key of the data file is determined to be invalid, the data file is ignored. If, on the other hand, the second authentication key of the data file is determined to be valid, the IPL request of the data file is executed so as to restart the VM-hosted system.

Figure 3:
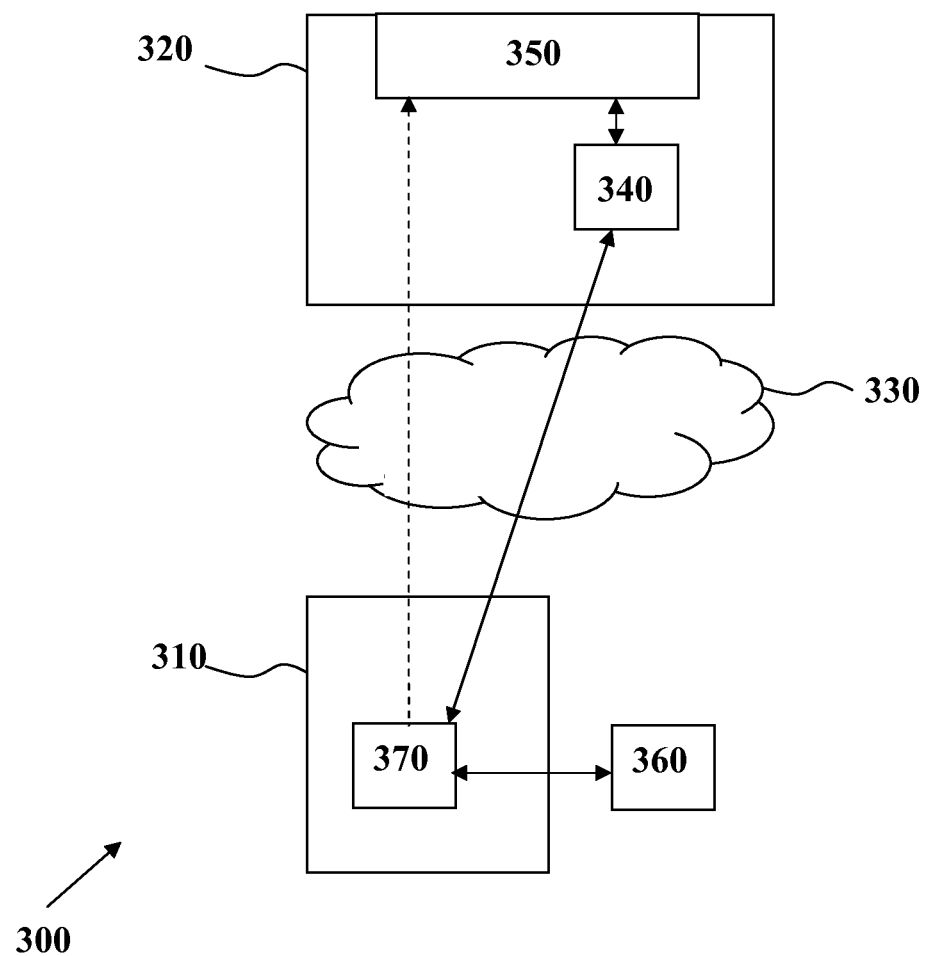
FIG. 3 is a schematic block diagram of system according to an embodiment of the invention.

Referring now to FIG. 3, there is shown a schematic block diagram of system 300 according to an embodiment of the invention. The system 300 comprises a control client device 310 that is adapted to have remote access to a server 320 via a network 330. The server 320 comprises a processor 340 runs a VM which hosts an OS 350 for a user 360 to access via the network 330.

The control client device 310 comprises an IPL server 370 which is adapted to receive an access request from the user 360. In response to receiving such an access request, the IPL server 370 generates a shut-down instruction and transmits it to the VM-hosted system 350. The shut-down instruction comprises a first set of authentication details generated from authentication information stored in the control client device 310 (or provided to the control client device 310 by the user 360).

The hosted system 350 receives the shut-down instruction from the control client device 310 (via the network 330) and verifies the first set of authentication details of the shut-down instruction. If the first set of authentication details are verified as being authentic (e.g. trusted, correct or equal to a first set of authentication details stored by the server 320), the processor executes the shut-down instruction to shut-down the VM-hosted OS 350.

The IPL server 370 also generates an IPL file and transmits the IPL file to the server 320 after the VM-hosted OS 350 has been shut-down. The IPL file comprises: an IPL request, a second set of authentication details; identification details of the VM-hosted OS; and identification details of the user 360.

The processor 340 of the server 320 receives the IPL file from the control client device 310 (via the internet 330) and verifies the second set of authentication details of the IPL file. If the second set of authentication details are verified as being authentic (e.g. trusted, correct or equal to a second set of authentication details stored by the server 320), the processor executes the IPL request of the IPL file to re-start the VM-hosted OS 350.

It will be clear to one of ordinary skill in the art that all or part of the method of one embodiment of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, e.g. a CD-ROM, DVD, USB stick, memory card, network-area storage device, internet-accessible data repository, and so on, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, one embodiment may be realized in the form of a computer implemented method of deploying a service comprising steps of deploying computer program code operable to cause the computer system to perform all the steps of the method when deployed into a computer infrastructure and executed thereon.

In a further alternative, one embodiment may be realized in the form of a data carrier having functional data thereon, the functional data comprising functional computer data structures to, when loaded into a computer system and operated upon thereby, enable the computer system to perform all the steps of the method.

The flowchart and block diagram in the above figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments have been illustrated in detail, one of ordinary skill in the art will appreciate that modifications and adaptations to those embodiments may be made.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for providing authorized remote access to an operating system hosted by a virtual machine (VM), the method comprising:
    defining, at a client system, a first profile and a first key for a first user and a second profile and a second key for a second user, the first profile and first key for the first user and the second profile and the second key for the second user also being defined on a server system;
    receiving, at the client system from the first user, a request for an initial program load (IPL) of an operating system hosted by the VM, the VM being provided by a server system;
    generating, at the client system, a first authentication token for the second user and a shut-down instruction for shutting down the operating system, the first authentication token being generated based on the second key of the second user the second user currently having access to the operation system;
    communicating, by the client system, the first authentication token and the shut-down instruction to the server system, the first authentication token being verifiable by the server system using the second key prior to execution of the shut-down instruction on the server system to shut-down the operating system;
    confirming, at the client system, the shut-down of the operating system;
    in response to the confirming, generating, at the client system, a second authentication token for the first user and an IPL instruction for restarting the operating system, the second authentication token being generated based on the first key of the first user; and
    communicating, by the client system, the second authentication token and the IPL instruction to the server system, the second authentication token being verifiable by the server system using the first key prior to execution of the IPL instruction on the server system to re-start the operating system.

2. The method of claim 1, the confirming, at the client system, of the shut-down of the operating system comprising monitoring the operating system to determine when the operating system is completely shut-down.

3. The method of claim 1, wherein the shut-down instruction further comprises at least one of: an identification of a user of the client system; and an identification of the operating system.

4. The method of claim 1, wherein the IPL instruction further comprises at least one of: an identification of a user of the client system; and an identification of the operating system.

5. The method of claim 1, wherein at least one of: the first authentication token; and the second authentication token is generated based on at least one of: the request for the IPL of the operating system; and authentication information provided by the client system or a user of the client system.

6. The method of claim 1, wherein at least one of: the first authentication token; and the second authentication token comprises a one-time use pass key adapted to be rendered invalid when its validity has been checked.

7. A computer program product for providing authorized remote access to an operating system hosted by a virtual machine (VM), the computer program product comprising a non-transitory computer-readable storage medium having computer-readable program code embodied therewith, the computer-readable program code being executable by a processor of a client system to perform a method, the method comprising:
    defining a first profile and a first key for a first user and a second profile and a second key for a second user, the first profile and first key for the first user and the second profile and the second key for the second user also being defined on a server system;
    receiving, from the first user, a request for an initial program load (IPL) of an operating system hosted by the VM, the VM being provided by a server system;
    generating a first authentication token for the second user and a shut-down instruction for shutting down the operating system, the first authentication token being generated based on the second key of the second user and the second user currently having access to the operating system;
    communicating the first authentication token and the shut-down instruction to the server system, the first authentication token being verifiable by the server system using the second key prior to execution of the shut-down instruction on the server system to shut-down the operating system;
    confirming the shut-down of the operating system;
    in response to the confirming, generating a second authentication token for the first user and a IPL instruction for restarting the operating system, the second authentication token being generated based on the first key of the first user; and
    communicating the second authentication token and the IPL instruction to the server system, the second authentication token being verifiable by the server system using the first key prior to execution of the IPL instruction on the server system to re-start the operating system.

8. A computer system comprising:
    a computer program product comprising a non-transitory computer-readable storage medium having computer-readable program code embodied therewith; and at least one processor accessing the non-transitory computer-readable storage medium and executing the computer-readable program code to perform a method for providing authorized remote access to an operating system hosted by a virtual machine (VM), the method comprising:

defining a first profile and a first key for a first user and a second profile and a second key for a second user, the first profile and the first key for the first user and the second profile and the second key for the second user also being defined on a server system;

receiving, from the first user, a request for an initial program load (IPL) of an operating system hosted by the VM, the VM being provided by a server system;

generating a first authentication token for the second user and a shut-down instruction for shutting down the operating system, the first authentication token being generated based on the second key of the second user and the second user currently having access to the operating system;

communicating the first authentication token and the shut-down instruction to the server system, the first authentication token being verifiable by the server system using the second key prior to execution of the shut-down instruction on the server system to shut-down the operating system;

confirming the shut-down of the operating system;

in response to the confirming, generating a second authentication token for the first user and an IPL instruction for restarting the operating system, the second authentication token being generated based on the first key of the first user; and communicating the second authentication token and the IPL instruction to the server system, the second authentication token being verifiable by the server system using the first key prior to execution of the IPL instruction on the server system to re-start the operating system.

9. A client system for providing authorized remote access to an operating system hosted by a virtual machine (VM) of a server system, the client system comprising:

a processor comprising:

an initial program load (IPL) server defining a first profile and a first key for a first user and a second profile and a second key for a second user, the first profile and first key for the first user and the second profile and the second key for the second user also being defined on a server system; and an IPL request unit receiving, from the first user, a request for an IPL of an operating system hosted by the VM; and, generating a first authentication token for the second user and a shut-down instruction for shutting down the operating system, the first authentication token being generated based on the second key of the second user and the second user currently having access to the operating system; and a communication interface communicating the first authentication token and the shut-down instruction to the server system, the first authentication token being verifiable by the server system using the second key prior to execution of the shut-down instruction on the server system to shut-down the operating system, the IPL request unit further confirming the shut-down of the operating system and, in response to the confirming, generating a second authentication token for the first user and an IPL instruction for restarting the operating system, the second authentication token being generated based on the first key of the first user, and the communication interface further communicating the second authentication token and the IPL instruction to the server system, the second authentication token being verifiable by the server system using the first key prior to execution of the IPL instruction on the server system to restart the operating system.

10. The client system of claim 9, the IPL request unit confirming the shut-down of the operating system by monitoring the operating system to determine when the operating system is completely shut-down.

11. The client system of claim 9, wherein at least one of: the shut-down instruction; and the IPL instruction further comprises at least one of: an identification of a user of the client system; and an identification of the operating system.

12. The client system of claim 9, wherein the IPL request unit generates at least one of: the first authentication token; and the second authentication token is based on at least one of: the request for the IPL of the operating system; and authentication information provided by the client system or a user of the client system.

13. A server system for providing authorized remote access to an operating system hosted by a virtual machine (VM) of the server system, the server system comprising:

a processer defining a first profile and a first key for a first user and a second profile and a second key for a second user, the first profile and the first key to the first user and the second profile and the second key for the second user also being defined on a client system; and a communication interface receiving, from the client system, a first authentication token for the second user and a shut-down instruction for shutting down the operating system, the first authentication token being generated by the client system based on the second key of the second user and the second user currently having access to the operating system, the processor further comprising a verification unit verifying that the first authentication token is valid based on the second key, the processor further executing the shut-down instruction on the server system to shutdown the operating system when the verification unit verifies that the first authentication token is valid, the communication interface further receiving, from the client system, a second authentication token for the first user and a IPL instruction for restarting the operating system, the second authentication token being generated by the client system based on the first key of the first user following confirmation of the shut-down of the operating system, the verification unit further verifying that the second authentication token is valid based on the first key, and the processor further executing the IPL instruction to re-start the operating system when the verification unit verifies that the second authentication token is valid.

14. The server system of claim 13, wherein the shut-down instruction further comprises at least one of: an identification of a user of the client system; and an identification of the operating system; and wherein the verification unit verifying that the first authentication token is valid based on at least one of an identification of a user of the client system; and an identification of the operating system.

15. The server system of claim 13, wherein the IPL instruction further comprises at least one of: an identification of a user of the client system; and an identification of the operating system; and wherein the verification unit verifying that the second authentication token is valid based on at least one of: an identification of a user of the client system; and an identification of the operating system.

* * * * *